United States Patent [19]
Rourke

[11] Patent Number: 5,837,169
[45] Date of Patent: Nov. 17, 1998

[54] CREATION OF BRAGG REFLACTIVE GRATINGS IN WAVEGUIDES

[75] Inventor: Howard Neil Rourke, Bishop's Stortford, United Kingdom

[73] Assignee: Northern Telecom Limited, Montreal, Canada

[21] Appl. No.: 752,699

[22] Filed: Nov. 19, 1996

[51] Int. Cl.[6] .................................................. B29D 11/00
[52] U.S. Cl. .......................... 264/1.27; 264/1.37; 385/10
[58] Field of Search .................................. 264/1.24, 1.27, 264/1.31, 1.36, 1.37, 13.8; 285/10, 37; 356/400, 401

[56] References Cited

U.S. PATENT DOCUMENTS

| | | | |
|---|---|---|---|
| 4,251,160 | 2/1981 | Bouwhuis et al. | 356/401 |
| 4,749,278 | 6/1988 | Van Der Werf | 356/401 |
| 5,351,321 | 9/1994 | Snitzer et al. | 385/10 |
| 5,400,422 | 3/1995 | Askins et al. | 385/10 |

FOREIGN PATENT DOCUMENTS

19605062C1  6/1997  Germany .

OTHER PUBLICATIONS

Kashyap, R., et al., "Novel Method of Producing All Fibre Photoinduced Chirped Gratings," Electronics Letters, vol. 30, No. 12, Jun. 9, 1994, pp. 996–998.

Albert, J., et al., "Minimization of Phase Error in Long Fiber Bragg Grating Phase Masks Made Using Electron Beam Lithography," IEEE Photonics Technology Letters, vol. 8, No. 10, Oct. 1996, pp. 1334–1336.

Stubbe, R., et al., "Novel Technique for Writing Long Superstructured Fiber Bragg Gratings," Photosensitivity and Quadratic Nonlinearity in Glass Waveguides Fundamentals and Applications, vol. 22, Sep. 9, 1995, pp. 285–287.

Primary Examiner—Mathieu D. Vargot
Attorney, Agent, or Firm—John D. Crane

[57] ABSTRACT

A method of avoiding phase discontinuities between adjacent sections of a long Bragg grating written section-by-section in an optical fibre uses masks with alignment parts additional to their writing parts. Each alignment part is a replica of a portion of the writing part of the adjacent mask. The writing of the Bragg grating produces an associated absorption grating and so, for light directed in series through the alignment part of the mask and the already-written previous section of the grating, transmission is at a maximum when the mask is moved into exact registry. Fine adjustment of mask position is made to find this condition before writing with this mask is commenced.

9 Claims, 3 Drawing Sheets

CREATION OF BRAGG REFLACTIVE GRATINGS IN WAVEGUIDES

BACKGROUND TO THE INVENTION

This invention relates to the creation of Bragg reflective gratings in optical waveguides, typically optical fibre waveguides, by irradiation, typically irradiation with ultraviolet light, through a mask, typically a phase mask, or alternatively by holographic means. One particular application for such reflective gratings is for chromatic dispersion equalisation in optical transmission systems. Such a use is described in the specification of U.S. Pat. No. 4,953,939.

Some applications for Bragg reflective gratings require a grating length which is longer than it is convenient to make a single mask for creating such a grating. There may, for instance, be a requirement to make a Bragg grating in the region of a meter long, whereas there are considerable difficulties in making an electron-beam fabricated mask much longer than about one hundred millimeters. A solution that has been proposed for overcoming this problem is to create the long grating step-wise in a success of sections arranged end-to-end. Each section, except for the first to be created section, is created to commence at, or just beyond, the end of the next previously created section. If the long grating is designed for use in a wavelength division multiplexed (WDM) environment in which each section has a spectral bandwidth covering the whole spectrum of a single channel of the WDM signal, then it may be possible to arrange matters such that the reflection bands of the individual sections of the grating are spectrally separated by guard bands lying entirely within the spectral guard bands that separate the individual channels of the WDM signal. Under these circumstances any physical separation between adjacent sections of the grating is largely immaterial.

On the other hand, if breaks in the spectral reflection characteristic of the long grating are to be avoided, there is the problem that the spectral characteristic of one section will be cutting on at a point in the spectrum where the spectral characteristic of another section is cutting off. This means that both sections will be partially reflecting at a common wavelength. If the effective points of reflection are coincident, there is no problem. On the other hand, if one is longitudinally displaced from the other, then the two reflection components will coherently interfere, with the result that the magnitude of the resultant reflection is critically dependent upon the phase separation existing between the interfering components. A paper by R Kashyap et al entitled, 'Super-step-chirped fibre Bragg gratings', Electronics Letters (18 Jul. 1986) Vol. 32, No 15, pp 1394–6 explains that by deliberately arranging for adjacent sections of the grating not to abut, but to be separated by short intervening portions of waveguide, it is possible to make use of the photorefractive effect, and use UV light to trim the effective optical path length of any intervening portion to bring the phase separation of the two interfering components to a desired value. By this means it is possible to smooth out dips in the spectral reflection characteristic of the overall Bragg grating that can result from non-optimised intervals between adjacent sections of the grating. A drawback to this approach to lining up the sections is that it specifically requires a spacing between adjacent sections, and hence the delay time, the time taken by light of any particular wavelength to propagate from one end of the waveguide containing the Bragg grating to its point of reflection and back to the same end, is not a smoothly varying function of wavelength, but a function that contains as many steps, or more complicated discontinuities, as there are spaces between adjacent sections of grating, the delay in these discontinuous regions being affected by Fabry Perot type resonance effects between components of the same wavelength being reflected by the two adjacent grating sections.

SUMMARY OF THE INVENTION

The present invention is directed to a method of lining up the sections of an optical waveguide Bragg reflective grating as it is created section-by-section, the method having the particular property that it does not require there to be any spacing between adjacent sections that allows their direct abutment.

The method of the invention relies upon the fact that the irradiation, that is employed to create a fringe pattern of refractive index (real part) changes in the waveguide that co-operate to form the Bragg reflective grating, does not change exclusively the real part of the refractive index, but changes also the imaginary part, i.e. produces a concomitant optical absorption fringe pattern. The method of the present invention makes use of this fact to provide a method of aligning a mask ready for creating a specific section of the Bragg grating relative an adjacent section of the grating that has already been created. For this purpose the mask is provided with an overlap portion that creates a fringe pattern with a periodicity that effectively matches a corresponding adjacent end portion of the already created adjacent grating section. This overlap portion is used only for mask alignment purposes, and is not irradiated when the mask is actually being used to create its corresponding section of the Bragg grating. The alignment process involves projecting light through the series combination of the overlap portion of the mask and the adjacent end portion of the already created adjacent grating section. This light should be at a wavelength that is differentially absorbed by the optical absorption fringe pattern present in the already created adjacent grating section, but should be of an intensity low enough to enable the alignment process to be completed without risk of significant photorefractive effect disturbance of that fringe pattern.

When the mask is in perfect registry, the bright portions of the fringes created by its alignment portion are precisely aligned with the least absorbing regions of the optical absorption fringe pattern present in the corresponding already created section of the Bragg grating, and hence the transmission of the projected light is at a maximum. If the fringe patterns were to both to have the same uniform pitch, then the transmission would be cyclically modulated between a maximum value and a minimum value as the mask and grating are moved progressively further out of precise registry with each other. If the fringe patterns were to have the same uniformly chirped pitch there would be a principal maximum associated with perfect registry, and progressively reduced magnitude maxima with increasing departure from perfect registry.

Typically the mask is a phase mask designed so as to minimise power launch into the zero diffraction order, in which case the transmission is monitored by locating a photodetector to collect light launched into another diffraction order, typically the first.

BRIEF DESCRIPTION OF THE DRAWINGS

There follows a description of the creating of a Bragg reflection grating in an optical fibre waveguide, the method embodying the invention in a preferred form. The description refers to the accompanying drawings, in which.

DETAILED DESCRIPTION OF A PREFERRED EMBODIMENT

Figure 1:
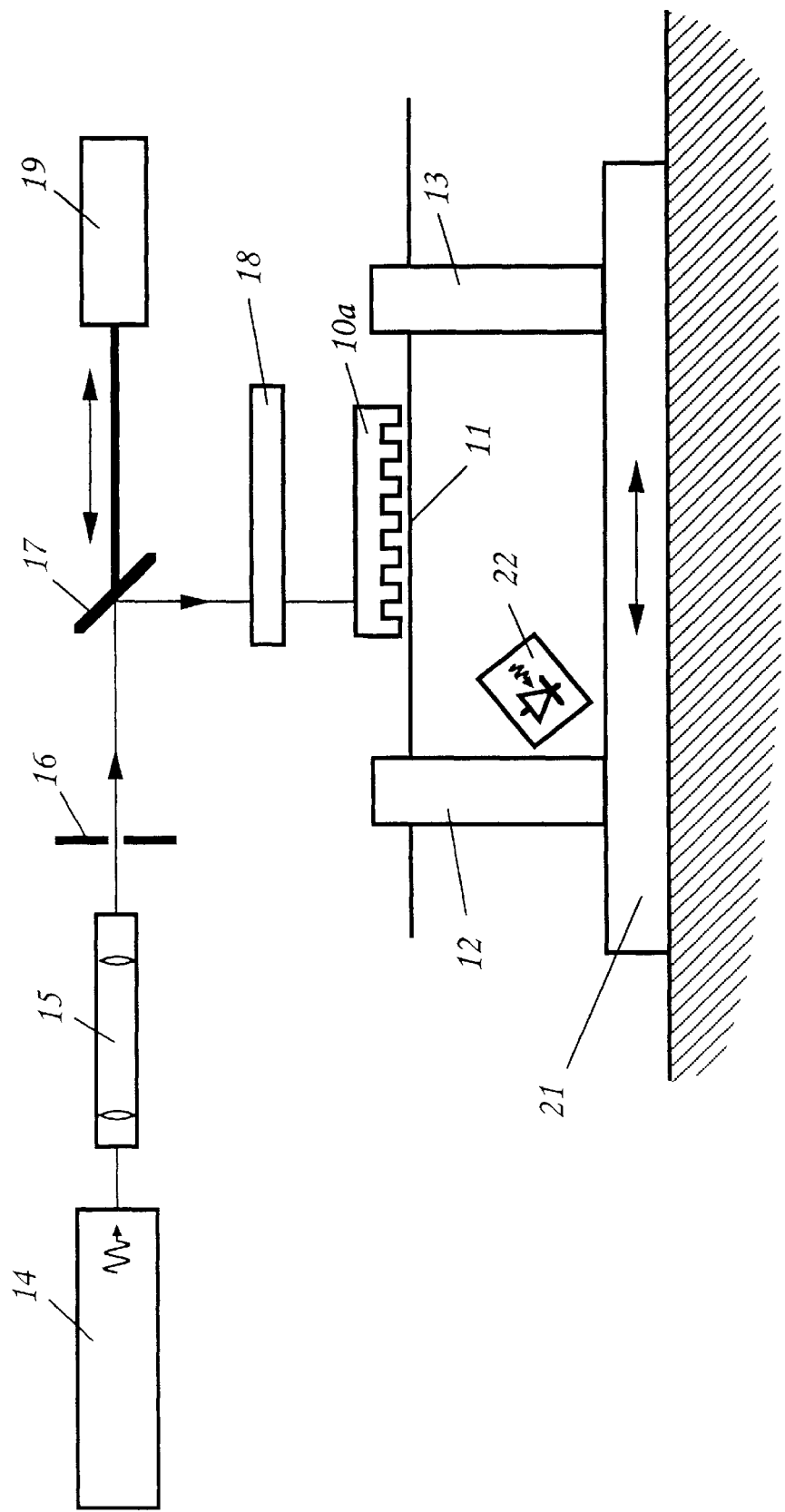
FIG. 1 is a schematic diagram of the apparatus employed to create the Bragg reflective grating.

Referring to FIG. 1, a portion of a length 11 of single mode optical fibre in which the grating is to be created, is lightly tensioned between two supports 12 and 13 so as to be almost in contact with a phase grating 10a, which is oriented so that its grating lines extend transversely of the fibre axis, preferably at right angles to that axis. An argon ion laser 14 providing a frequency doubled ultraviolet light output at 244 nm has this output directed on to the phase grating 10a via a telescope 15, an aperture 16, a mirror 17 and a cylindrical lens 18. The mirror 15 is attached to a stepper drive 19 by means of which the mirror can be translated in a controlled manner in the axial direction of the fibre 11 so as to track the light beam across the phase grating 10a in the axial direction of the fibre 11.

The phase mask 10a is a phase contrast diffraction grating created in a thin sheet of silica. For this purpose the silica sheet was coated with a layer of chromium that was itself patterned by electron beam lithography to form a mask for reactive ion etching of the underlying silica. The depth of the etch was chosen to suppress the zero order diffraction of light normally incident upon the phase mask. The laser has a cw output of approximately 100 mW at 244 nm, of which approximately half is concentrated by the optical system at the phase mask in a substantially rectangular zone measuring approximately 3 mm by 150 $\mu$m with its long axis aligned with the fibre axis. This power was found sufficient to write, with a single traverse at 100 $\mu$m per second of the beam of light in the axial direction of unhydrogenated fibre whose core was doped with boron and germania in a manner similar to that described by D L Williams et al in the paper entitled, 'Enhanced UV Photosensitivity in Boron Co-doped Germanosilicate Fibres', Electronics Letters 7th January 1993 Vol. 29, No. 1, pages 45–47.

The above details typify but one of several different alternative methods by which the first section of the Bragg grating could have been created in the fibre 11, and thus far the method of the invention has not been distinguished over the prior art.

Figure 2:
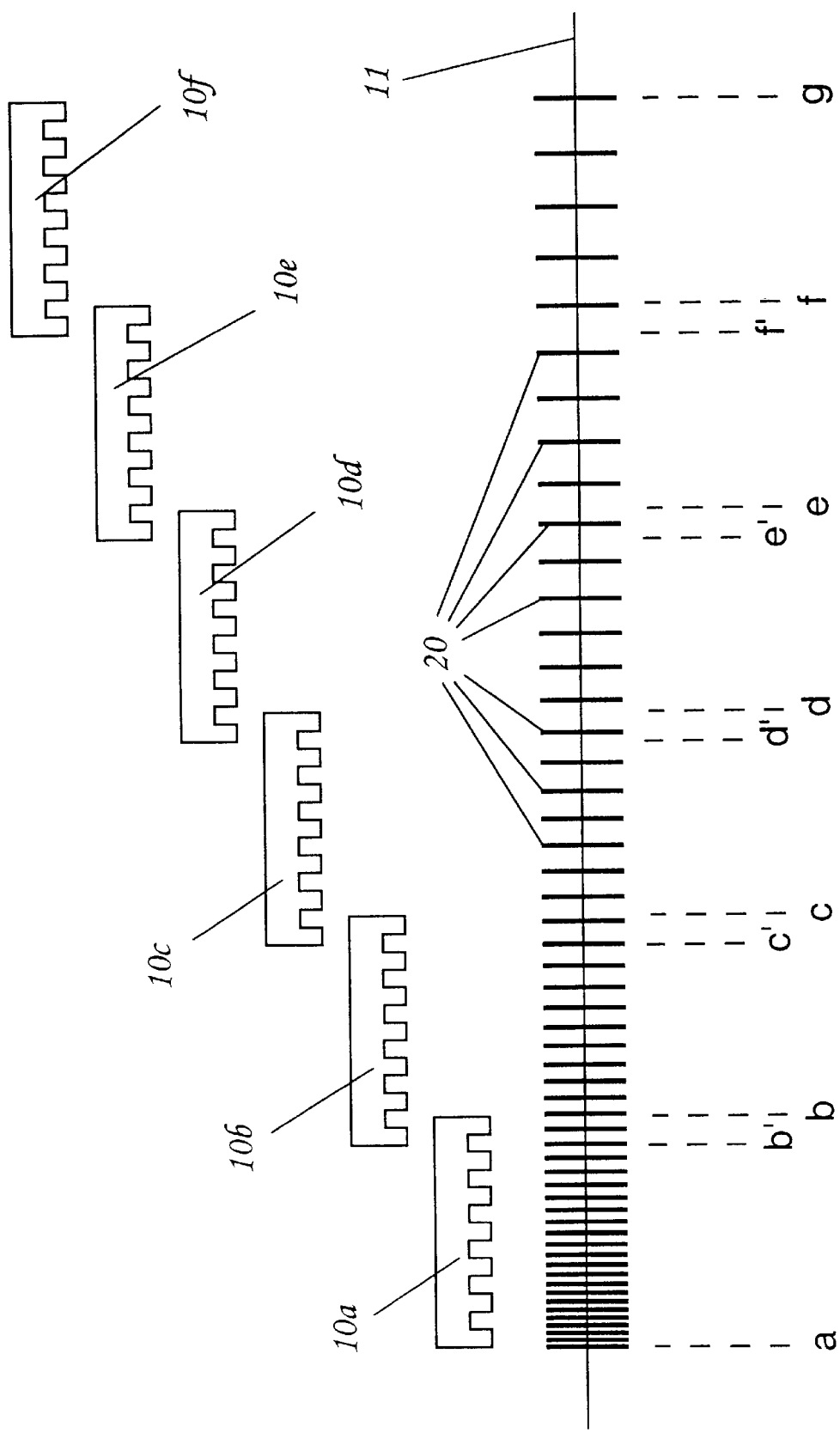
FIG. 2 is a schematic diagram of the grating.

In the particular case of a long Bragg reflective grating created in a length of single mode fibre 11 for use as in dispersion compensation, the pitch of the grating is not uniform, but is monotonically chirped from one end to the other as schematically represented by the lines 20 in the diagram of FIG. 2. For the creating of such a grating section-by-section, a different one of a set of masks is used for the creation of each section. For illustrative purposes only, this set has been represented in FIG. 2 as the set of six masks 10a to 10f. In the case of these six masks, mask 10a is employed to create the lines 20 in the range from a to b for creating those in the range b to c, and so on. Mask 10a covers the range from a to b, but each of the other masks 10b to 10f covers a range that also extends over a portion of the preceding range. Thus mask 10b covers the range b to c, the range that it writes into the fibre, but also the portion b' to b of the range a to b written using mask 10a. It is this portion b' to b, and the corresponding portions c' to c, d' to d, e' to e and f' to f that, according to the method of this invention, are used for alignment purposes.

Ideally the chirping of the grating would have been both monotonic and smooth, but with the particular E-beam apparatus employed to make the set of phase masks, this was not a practical proposition. Accordingly, an approximation to a smoothly chirped grating was provided using phase masks which, instead of being smoothly graded in pitch, were step-graded, typically with between two- and three-hundred steps. Within each step the pitch is constant, but there is a smooth progression of pitch from step to step within phase mask from one end to the other. The precision of the E-beam was sufficient to preclude indexing problems between the component steps of any individual phase mask.

For convenience of illustration, FIG. 2 shows the masks 10a to 10f arranged in echelon but, when each is actually being used for creating its associated section of Bragg grating, it is in the same close-spaced relationship with the fibre 11 as described earlier with particular reference to FIG. 1 concerning the positional relationship between mask 10a and fibre 11.

Conveniently, each mask 10b to 10f is placed, in its turn, in the position formerly occupied by mask 10a, and the fibre 11 is indexed along in its axial direction by approximately the required amount to obtain the requisite alignment between this mask and the Bragg grating already created in the fibre 11. Relying solely upon dead-reckoning, such indexing can achieve an accuracy of typically about 1 to 2 $\mu$m, but a greater precision is required. This is achieved by following the dead-reckoning indexing by a fine adjustment of relative position. This fine adjustment is achieved using a high precision translation stage 21 (FIG. 1), for instance a piezo-electric or electrostrictive translation stage, to which either the mask is mounted, or the fibre supports 12 and 13. For ease of illustration, FIG. 1 depicts the fibre supports 12 and 13 as being mounted on the translation stage.

Figure 3:
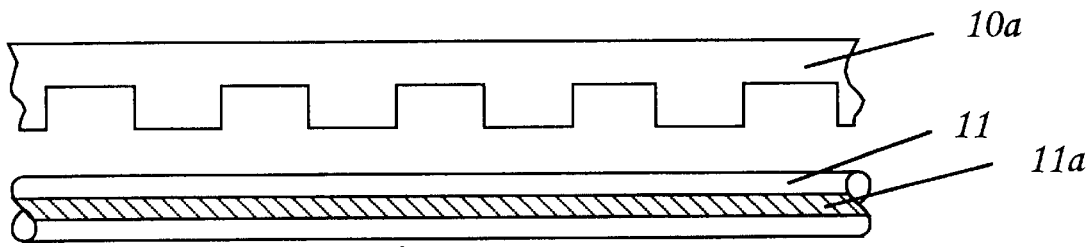
FIGS. 3 to 5 are scrap views of a portion of the fibre during successive stages of the creation of a section of the Bragg reflective grating within it.
Figure 4:
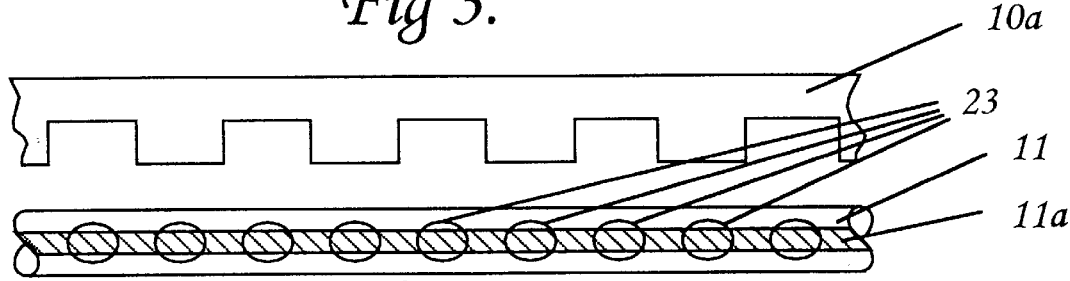
Figure 5:
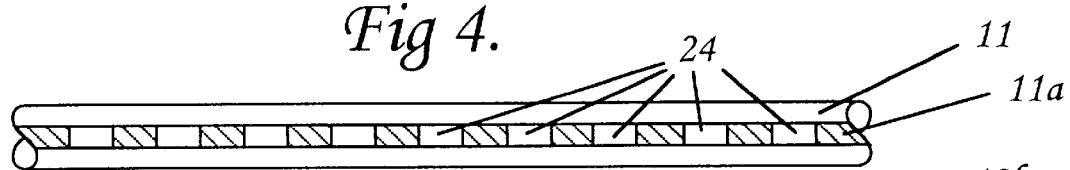
Figure 6:
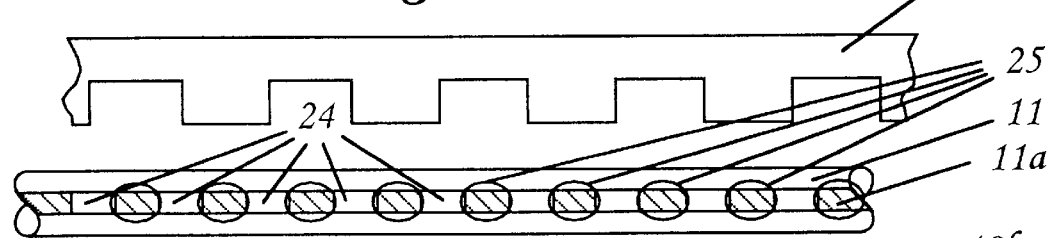
FIGS. 6 to 8 illustrate the alignment procedure employed to align a mask employed for creating the next adjacent section of the Bragg reflective grating.

The way the fine adjustment is achieved will now be described with particular reference to FIGS. 3 to 8, which specifically relate to the fine adjustment of the position of mask 10b in relation to fibre 11. These FIGS. 4 to 8 depict a portion of the fibre 11 lying between b' and b of FIG. 2. FIG. 3 shows a portion of the fibre 11, with its doped core 11a, and also a portion of the mask 10a in position preparatory for creating a section of Bragg reflective grating in the fibre 11. FIG. 4 depicts the actual creation of that section of grating. This is achieved by directing the intense ultraviolet light from laser 14 through the mask 10a to form a fringe pattern of intense spots 23 of light which, by the photorefractive effect produce corresponding volumes of increased refractive index and reduced absorption in the core 11a. These volumes are depicted at 24 in FIG. 5, which depicts the fibre 11 after removal of mask 10a. FIG. 6 depicts the situation once mask 10b has been index into approximately correct position relative the fibre, and while a portion of the region of mask 10b lying between b' and b is illuminated with interrogation illumination to produce a fringe pattern of spots 25 of light. This region of the mask 10b is an exact replica of the region of mask 10a lying between b' and b.

Accordingly, within the region lying between b' and b, the relative disposition of the enhanced index, reduced absorption volumes 24, which exactly matches the relative disposition of the fringe pattern of intense spots 23 produced by mask 10a, is itself exactly matched by the relative disposition of the fringe pattern of spots 25 produced by mask 10b.

In the specific case of using the step-graded phase masks described above, the region lying between b' and b may typically and conveniently comprise a single one of those steps.

The interrogation illumination to produce the fringe pattern of spots 25 must be of a wavelength and intensity that does not produce any significant photorefractive effect changes of its own upon the fibre 11, but on the other hand must be at a wavelength for which there is differential absorption, i.e. for which the absorption presented to it by the volumes 24 of reduced absorption differs noticeably from that presented to it by the intervening regions of core 11 a. For the particular fibre composition and illumination conditions quoted above it has been found that these criteria are adequately met by using the same wavelength (244 nm), but reducing the intensity at the mask by approximately 20 dB. The literature indicates that different dopant recipes appear to exhibit different breadths of absorption spectra, and hence with some recipes it may be possible to use a significantly longer wavelength for interrogation purposes than is used for writing the Bragg grating, and thereby further reduce the risk that the interrogation produces its own (unwanted) writing effect.

Figure 7:
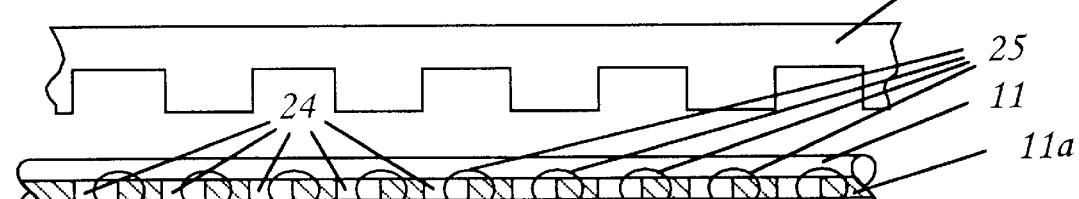

If the dead-reckoning indexing that brings the mask 10b into approximately the required position relative the fibre 11, but misses the exact position by approximately half a fringe period, then the interrogation spots 25 will be lined up, as depicted in FIG. 6, with the higher absorption regions lying between adjacent reduced absorption regions 24. If it missed by approximately a quarter of a fringe period, the situation would be as depicted in FIG. 7, with the interrogation spots 25 only half registering with that reduced absorption regions 24. If it fortuitously provided the exactly required alignment, then the interrogation spots 25 would be fully registered with the reduced absorption regions 24, as depicted in FIG. 8.

Figure 8:
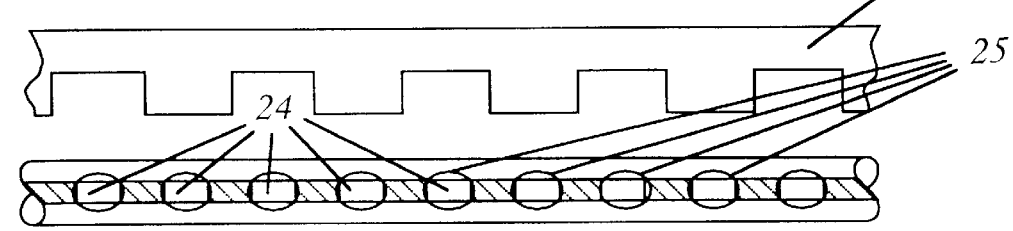

It is clear that the situation of FIG. 8, the exactly correct positioning relationship, provides the greatest transmission of the interrogation illumination through the fibre, while that of FIG. 6 provides a minimum. The piezo-electric translation stage 21 is therefore operated to cycle the relative positioning of mask 10b and fibre 11 while at the same time monitoring the output of a photodetector 22 (FIG. 1) positioned to intercept a portion of this transmitted light. Because the mask 10b has been designed to suppress zero order diffracted light, the photodetector 22 is preferably placed in a position to intercept first order diffracted light. The piezo-electric translation stage is then set to the position corresponding to the maximum output of the photodetector 22 and, while this position is maintained, the second section of the grating, the section from b to c is created in fibre 11. As stated previously, the portion of the grating from b' to b, having already been written (created) using mask 10a is not overwritten using mask 10b, and hence the corresponding portion of the mask 10b may itself be masked during the writing of the section from b to c.

The procedure for aligning and writing with the third and subsequent masks (masks 10c and successors) follows the same procedures outlined above in respect of aligning and writing with the second mask (mask 10b).

For the duration of each monitoring procedure, it is preferred to locate a chopper-blade (not shown) temporarily in the path of the light between the laser 14 and telescope 15 so that a phase-locked loop detection system may be employed for detecting the portion of light intercepted by the photodetector 22.

I claim:

1. A method of creating a Bragg reflective grating in an optical waveguide, in which method the grating is created step-by-step in a succession of sections each section of which is created by irradiation through a mask, and in which method each section, after the first to be created section is created in adjoining relationship with respect to a previously created section, and before it is created, light is projected through the series combination of a portion of the mask to be used for creating the section and a portion of the adjoining already created section, and the relative position of mask and grating is adjusted for maximised transmission of the projected light, and, while the relative position of maximised transmission is maintained, said section is created.

2. A method of creating a Bragg reflection grating in an optical waveguide, which method is as claimed in claim 1, and which method is applied to the creating of the grating in an optical waveguide that is an optical fibre waveguide.

3. A method of creating a Bragg reflection grating in an optical waveguide, which method is as claimed in claim 1, and wherein said mask is an optical phase grating mask.

4. A method of writing a Bragg reflection grating in an optical waveguide step-by-step in a succession of sections, each section having an associated mask employed for the writing of that section, wherein each mask, except for the mask employed for the writing of the first section to be written, has a writing part and an alignment part, wherein the alignment part of a mask is a replica of a portion of the writing part of another one of the masks, wherein prior to the writing of each section other than the first to be written section, the mask of the section to be written is located relative to the optical waveguide so that its alignment part is approximately coincident with the position formerly occupied by the portion of the writing part of the mask of which said alignment part is a replica when that writing part was employed to write its associated section of the Bragg reflective grating, and wherein fine adjustment of the location relative to the optical waveguide is made to maximise the transmission of interrogation light directed through the series combination of the alignment part of the mask of the section to be written and the already written portion of the Bragg reflective grating with which that alignment part has been approximately located, which interrogation light has a spectral content to which an already written section of the Bragg reflective grating exhibits differential optical absorption, and wherein, when the fine adjustment has been effected, the location of the mask relative to the optical waveguide is maintained while the mask is employed to write its associated section of the Bragg reflection grating.

5. A method of writing a Bragg reflection grating in an optical waveguide which method is as claimed in claim 4, and which method is applied to the writing of the grating in an optical waveguide which is an optical fibre waveguide.

6. A method of writing a Bragg reflection grating in an optical waveguide, which method is as claimed in claim 4, and wherein the masks employed for writing the sections are optical phase grating masks.

7. A method of writing a Bragg reflection grating in an optical waveguide step-by-step in a succession of sections, each section having an associated mask employed for the writing of that section, wherein each mask, except for the mask employed for the writing of the first section to be written, has a writing part and an alignment part, wherein the alignment part of a mask is a replica of a portion of the writing part of another one of the masks, wherein prior to the writing of each section other than the first to be written section, the mask of the section to be written is aligned in a two step process with a section of the Bragg reflection grating already written in the optical waveguide, which two step process comprises a first step of locating relative to the optical waveguide, the mask of the section to be written so that its alignment part is approximately coincident with the position formerly occupied by the portion of the writing part of the mask of which said alignment part is a replica when that writing part was employed to write its associated section of the Bragg reflective grating, said first step being followed by a second step, which comprises fine adjustment of the location relative to the optical waveguide to maximise the transmission of interrogation light directed through the series combination of the alignment part of the mask of the section to be written and the already written portion of the Bragg reflective grating with which that alignment part has been approximately located, which interrogation light has a spectral content to which an already written section of the Bragg reflective grating exhibits differential optical absorption.

8. A method of writing a Bragg reflection grating in an optical waveguide which method is as claimed in claim 7, and which method is applied to the writing of the grating in an optical waveguide which is an optical fibre waveguide.

9. A method of writing a Bragg reflection grating in an optical waveguide, which method is as claimed in claim 7, and wherein the masks employed for writing the sections are optical phase grating masks.

* * * * *